Oct. 4, 1966  C. S. McNULTY  3,276,481
APPARATUS FOR CONTROLLING LIQUID FLOW
Filed Aug. 13, 1964
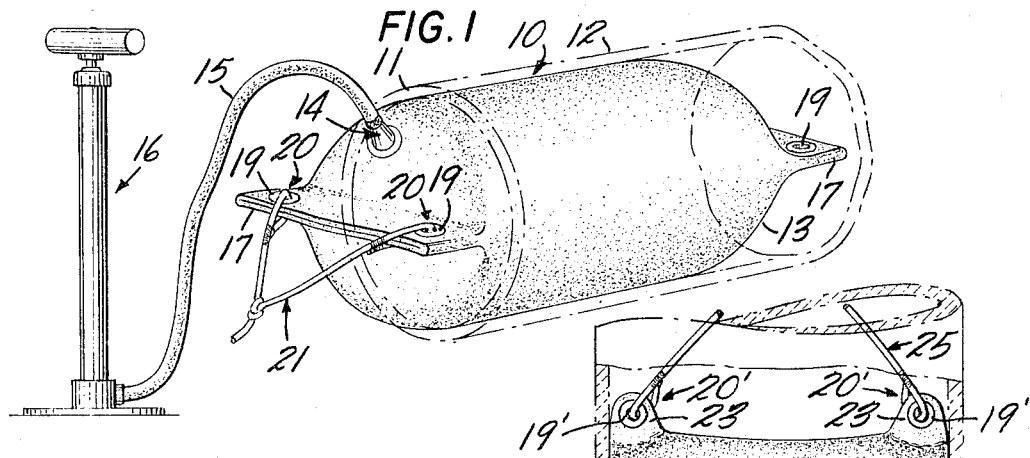
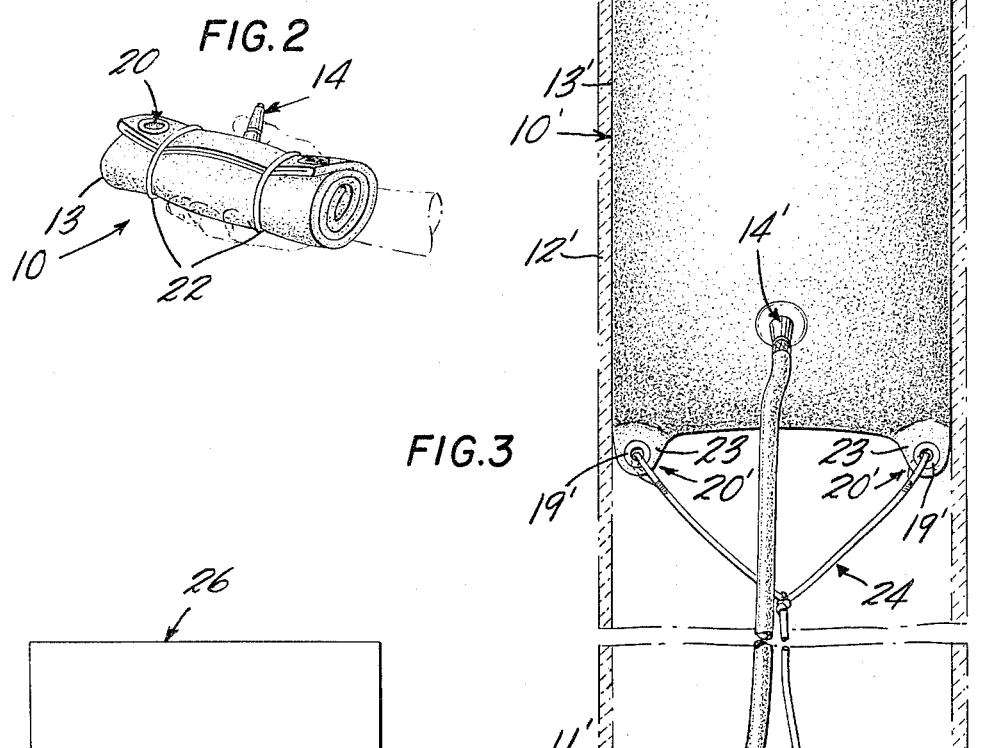
INVENTOR.
CARRELL S. McNULTY
BY Brumbaugh, Free,
Graves & Donohue
his ATTORNEYS.

United States Patent Office 3,276,481
Patented Oct. 4, 1966

3,276,481
APPARATUS FOR CONTROLLING LIQUID FLOW
Carrell S. McNulty, 35 Beulah Road, New Britain, Pa.
Filed Aug. 13, 1964, Ser. No. 389,290
1 Claim. (Cl. 138—93)

This invention relates to apparatus for stopping the flow of liquid in a conduit and, more particularly, to liquid flow controlling apparatus which is adapted for easy installation in and removal from a conduit through which the liquid flow is to be controlled.

There are many occasions in the design, construction and maintenance of a pipe system, such as a sewer, in which it is necessary to determine the rate of flow of liquid through the individual pipes or conduits of the system. For instance, during the initial construction the tightness of the system must be evaluated to determine whether it meets the criteria set forth in the specifications. In some instances the amount of exfiltration must be determined, while in others it is the amount of infiltration which must be measured. Furthermore, the detection of leaks in a pipe system is usually accomplished by comparing the flow rates at selected points in the system. Before such flow measurements can be accomplished, however, the individual pipeline in which the measurement is to be made must be isolated, and so the other lines communicating therewith must be plugged.

In the past, plugs made of cast iron have generally been used to stop the flow in sewer pipes. Such prior art plugs are heavy and thus awkward to handle, and a sledge is usually required to install them in a pipe. Furthermore, if the interior of the pipe is rough, caulking is required in order to obtain a positive seal. Moreover, such plugs can only be installed at the open end of a pipe, such as in a manhole. If there is a sufficient head of liquid behind these plugs, they are dislodged and may become jammed somewhere between manholes, in which case they must be dug out at considerable expense. Finally, it is not only difficult but also unsanitary to install conventional plugs in sewer lines in which there is an appreciable flow.

Accordingly, it is an object of the present invention to overcome the above-mentioned difficulties of conventional techniques for controlling the flow of liquid in a conduit.

Another object of the invention is to provide a novel apparatus which may be easily installed in and removed from a conduit through which the liquid flow is to be controlled.

A further object of the invention is to provide a novel liquid flow controlling apparatus which may be readily installed anywhere along the inside of a conduit.

These and other objects and advantages of the invention are attained by providing an inflatable bag having a valve through which fluid from any suitable source may be introduced. The ratio of the length of the bag to the diameter of the conduit for which the bag is designed is preferably such that a relatively low pressure in the bag positively seals the bag against a rough interior surface of the conduit in the presence of a relatively large head of liquid. There are provided at each end of the bag a pair of fastening terminals, to which tie lines may be secured, so that the deflated bag may be positioned where desired in the conduit, after which the bag may be inflated from a remote location to plug the conduit.

All of the above is more fully explained in the detailed description of the embodiments of the invention which follow, this description being illustrated by the accompanying drawings wherein:

FIG. 1 is a view in perspective of one embodiment of a typical apparatus for controlling the flow of liquid in a conduit (shown in phantom) according to the present invention, the apparatus being connected to a hand pump;

FIG. 2 is a view in perspective showing the apparatus of FIG. 1 deflated and rolled up; and FIG. 3 is a plan view of another embodiment of the apparatus according to the invention, showing an alternative form of fastening terminals, the apparatus being connected to a pressure tank.

In the representative embodiment of the invention shown by way of example in FIGS. 1 and 2, the liquid flow controlling apparatus 10 is disposed in the open end 11 of a conduit 12 (shown in phantom). The apparatus 10 includes a bag 13, preferably constructed of an elastomeric material such as rubber. Mounted on the bag 13 at one end thereof is a check valve 14 (which is preferably spring biased), through which a pressure fluid such as compressed air may be introduced into and maintained within the interior of the bag 13. When desired, the valve 14 may be actuated against the action of the biasing spring to deflate the bag. The apparatus 10 is shown connected through a hose 15 to a hand pump 16, by means of which the bag may be inflated in a conventional manner.

Each end of the bag 13 is formed into a tab portion 17 which is provided with a pair of spaced holes, each preferably fitted with a reinforcing ring 19 of suitable material, the reinforced holes comprising a pair of spaced fastening terminals 20, to which a tie line 21 may be secured. These terminals are preferably located substantially at the lateral edges of the tab portion 17 for reasons to be explained presently.

The bag 13 is preferably so shaped that when deflated it assumes a generally rectangular shape, so that it may be readily rolled up into a compact size, as illustrated in FIG. 2. A pair of elastic bands or cords 22, for example, may be used to retain the bag in the form illustrated. It can be seen that the apparatus is easily held in one hand or could be carried in a hip pocket when climbing into a manhole, for example.

Another embodiment of the invention is illustrated in FIG. 3. Like parts are designated with the same numbers used in the first embodiment, primes being added in FIG. 3. The apparatus of FIG. 3 differs from the first embodiment in the form taken by the fastening terminals 20'. The bag 13' is formed with a pair of spaced tabs 23 which receive the reinforcing rings 19'. Tie lines 24 and 25 may be secured to the ends of the bag, as illustrated, for reasons to be explained hereinafter. The bag 13' may be connected through the hose 15' to a pressure tank 26 in order to inflate the bag.

It is to be understood that the apparatus 10 or 10' could be supplied in a wide range of sizes to accommodate the various size pipes of a system. Thus, a family of pipe stoppers could be provided for the standard sewer pipe diameters from eight inches to 48 inches or larger, for example. Regardless of the size of the stopper, a shape is maintained in which the ratio of the length of the deflated bag to the diameter of the conduit for which the bag is designed is between about two to one and three to one, so that an inflation pressure of only a few pounds per square inch insures positive contact between the lateral wall of the bag and the interior pipe wall along a length of pipe approximately twice the magnitude of the pipe diameter. As a consequence, the pipe is positively sealed even though the interior surface be rough, and an inflation pressure of less than four pounds per square inch secures the stopper in a pipe against the expelling thrust of a 20 foot head of liquid.

If the open end of a pipe is to be plugged, the deflated bag is inserted into the pipe and inflated by the hand pump 16, for example. The bag may be deflated and the apparatus quickly removed from the conduit without any danger to the operator of being splashed from backed-up sewage. For example, by connecting a hose provided with a valve at the free end to the valve 14 so as to release the latter valve in a conventional manner, the bag may be remotely deflated by means of the free-end valve. Alternatively, the valve element may be removed from the valve 14 and the bag may then be inflated through a hose having a valve at the free end, the bag being remotely deflated by means of the free-end valve, as before. Before deflating the bag, the free end of the tie line 21 should be secured, for example to a manhole step, to prevent loss of the apparatus or rupture of the hose.

The intermediate portion of a conduit between two manholes can also be plugged by the apparatus of the invention. Referring to FIG. 3, the tie line 25 is first floated down from the upstream manhole (not shown) to the downstream end 11' of the pipe. This tie line is then secured to the upstream end of the apparatus 10', to the downstream end of which is secured the tie line 24. The valve element is removed from the valve 14', and the hose 15' is connected between the pressure tank 26 and the valve 14'. The apparatus is then pulled with the line 25, and steadied, if necessary, with the line 24, to the desired point in the pipe, after which it is inflated from the pressure tank. It should be noted that the provision of the spaced fastening terminals 20' prevents the apparatus from becoming jammed in the conduit, inasmuch as the connection of the lines 24 and 25 as illustrated insures that the lateral edges or corners at each end of the bag are pulled away from the pipe wall when the tie lines are under tension. As before, the bag may be deflated remotely by a valve (not shown) at the pressure tank.

The arrangement illustrated in FIG. 3 lends itself to the location of leaks in a pipeline, should there by infiltration for example. Thus, the line may be successively plugged along its length starting from the downstream end until flow is observed.

While the fundamental novel features of the invention have been shown and described, it will be understood that various substitutions, changes and modifications in the form and details of the apparatus illustrated and its manner of operation may be made by those skilled in the art without departing from the spirit and scope of the invention. All such variations and modifications, therefore, are included within the scope of the invention as defined by the following claim.

I claim:

Apparatus for stopping the flow of liquid in a conduit adapted for easy installation in and removal from said conduit comprising in combination an inflatable bag of elastomeric material, said bag when deflated being of generally rectangular shape and having four corners and adapted to be rolled into a generally cylindrical package, the ratio of the length of the deflated bag to the diameter of said bag when installed in said conduit being between about two to one and three to one, whereby the installed bag contacts said conduit along a length in the axial direction at least about twice the magnitude of the diameter of the installed bag, a pair of spaced fastening terminals at each end of said bag for securing at least one line to said apparatus, each of said fastening terminals being located substantially at a different corner of said bag, whereby a line may be secured to both fastening terminals at one end of said bag to pull the corners at said end away from said conduit when said apparatus is pulled through said conduit, and check valve means operatively connected to said bag for releasably maintaining fluid pressure within said bag.

References Cited by the Examiner

UNITED STATES PATENTS

| | | | |
|---|---|---|---|
| 329,773 | 11/1885 | Perry | 138—93 |
| 587,102 | 7/1897 | Meany | 138—93 |
| 827,835 | 8/1906 | White | 138—93 |
| 1,760,750 | 5/1930 | Goodman | 138—93 |
| 1,814,677 | 7/1931 | Fennema | 138—93 |
| 3,091,259 | 5/1963 | Alessio | 138—90 |

M. CARY NELSON, *Primary Examiner.*

HENRY T. KLINKSIEK, *Examiner.*